Figure 1:
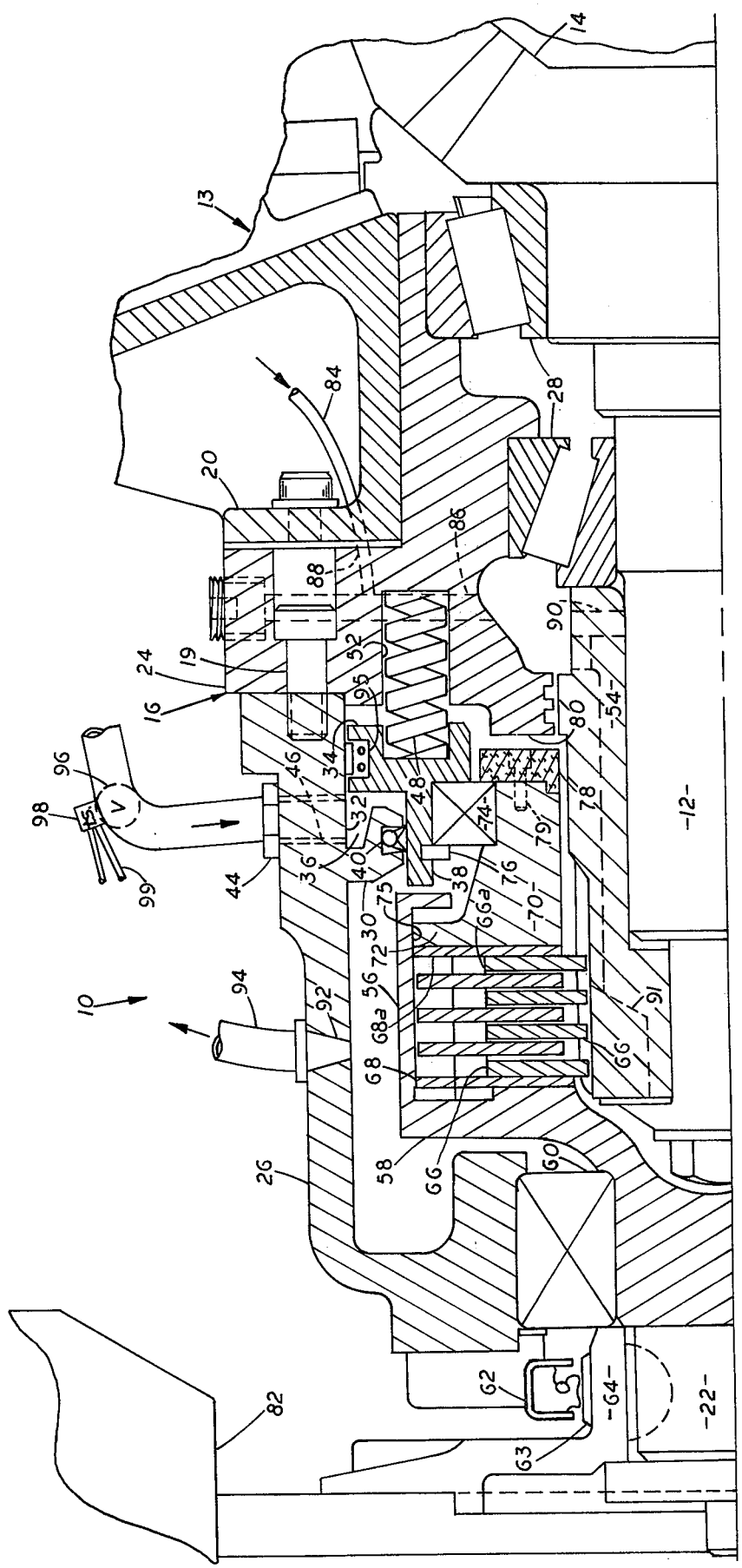

United States Patent [19]
Houser

[11] 3,915,269
[45] Oct. 28, 1975

[54] FAN DRIVE CLUTCH AND BRAKE APPARATUS

[75] Inventor: Raymond E. Houser, Wooster, Ohio

[73] Assignee: Rohr Industries, Inc., Chula Vista, Calif.

[22] Filed: Oct. 29, 1974

[21] Appl. No.: 518,364

[52] U.S. Cl. ............ 192/18 A; 192/82 T; 192/91 A; 192/113 B
[51] Int. Cl.² .......................................... F16D 25/08
[58] Field of Search .. 192/18 A, 91 A, 82 T, 85 CA

[56] References Cited
UNITED STATES PATENTS

| | | | |
|---|---|---|---|
| 3,638,773 | 2/1972 | Lewis et al. ........................ | 192/18 A |
| 3,684,397 | 8/1972 | Elmer .............................. | 192/91 A |
| 3,697,049 | 10/1972 | Wallace ........................... | 192/91 A |

*Primary Examiner*—Benjamin W. Wyche
*Attorney, Agent, or Firm*—Oldham & Oldham Co.

[57] ABSTRACT

The apparatus has an annular piston operatively positioned for engaging a stack of clutch discs in the drive apparatus and alternately keyed to and extending between an input and output shaft with clutch engagement pressure being provided by the annular piston. Spring means urge the annular piston axially for clutch disc engagement, while air supplied to the pressure cylinder releases the spring applied pressure to control clutch action. A brake means is associated with an input drive sleeve to stop rotation of such sleeve and of the output shaft by air pressure supplied to the pressure cylinder for retraction of the annular piston.

10 Claims, 2 Drawing Figures

FAN DRIVE CLUTCH AND BRAKE APPARATUS

BACKGROUND OF INVENTION

Heretofore there have been many different kinds of brake means provided and a number of clutch devices have been developed heretofore for use in providing a variable drive speed to an output shaft.

The fan in a conventional combustion engine is a driven output member that requires special speed of rotation controls in many instances to provide a fan speed correlated with the cooling action required for the engine. Heretofore there have been temperature responsive clutches provided for drive purposes and typical structures of that type are shown in U.S. Pat. Nos. 3,059,745 and 3,730,301. In other types of clutch and/or brake designs, it has been proposed heretofore to use springs for engaging the clutch or brake means for operative action while fluid pressures are used for clutch or brake release action. Typical constructions of such type are illustrated in prior U.S. Pat. Nos. 3,638,773 and 3,182,776.

While a variety of these clutch drive systems have been provided heretofore, the art needs an improved positive acting, easily controlled clutch drive system, especially for a cooling fan.

The general object of the present invention is to provide an improved drive system for a fan for a combustion engine to permit variable speed drive of the output shaft by a variable pressure engagement clutch disc system, and wherein a separate brake member is provided in the drive apparatus to prevent rotation of the output shaft under predetermined conditions.

Another object of the invention is to provide a relatively compact drive system for a cooling fan, and to provide an oil bath for the clutch means to utilize oil shear action for output drive under controlled pressure conditions.

Yet another object of the invention is to provide a relatively simple, uncomplicated drive system which can be readily controlled in output speed dependent upon a control air pressure supplied thereto.

The foregoing and other objects will be made apparent as the specification proceeds.

Figure 2:
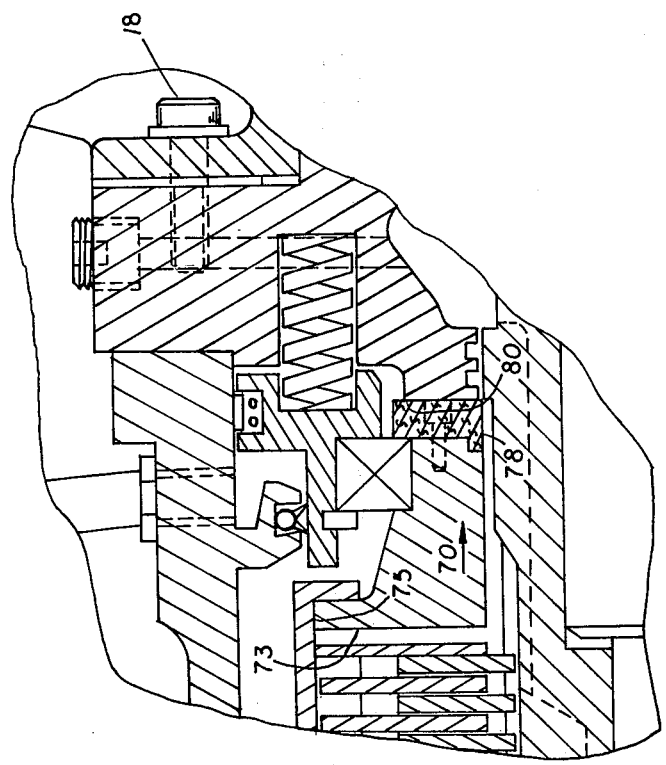

Attention now is directed to the accompanying drawings in which:

FIG. 1 comprises a longitudinal section through a fan drive clutch and brake apparatus embodying the principles of the invention, with the clutch engaged; and FIG. 2 is a fragmentary section of the apparatus with brake engaged.

When referring to corresponding members shown in the accompanying drawing and described in the specification, corresponding numerals are used to facilitate comparison therebetween.

SUBJECT MATTER OF INVENTION

A drive apparatus for a fan of a combustion engage and including a driven input shaft, an output shaft, a housing for the shafts, and characterized by the provision of an annular piston slidably positioned in the housing and forming a pressure cylinder therewith, a pressure sleeve, an output sleeve operatively connected to the output shaft, an input sleeve carried by the input shaft and rotatable therewith, which input shaft is positioned concentrically of and within the output sleeve, a stack of clutch discs alternately keyed to the output sleeve and to the input sleeve, bearing means securing the pressure sleeve to the annular piston for axial movement therewith, which pressure sleeve is adapted to operatively engage the clutch discs for applying compressive pressures thereto, spring means urging the annular piston axially for forcing the pressure sleeve into engagement with the stack of clutch discs, which pressure sleeve has an end in splined engagement with the output sleeve for rotation therewith, a brake means secured to an end of the pressure sleeve remote from the clutch discs and which brake means is adjacent a pressure surface formed on the housing, and variable pressure air supply means connected to the pressure cylinder to retract the annular piston and bring the brake means into engagement with the housing to stop rotation of the pressure sleeve and hence of the output shaft when predetermined air pressures are supplied to the pressure cylinder.

The fan clutch drive and brake apparatus of the invention is indicated as a whole by the numeral 10. This apparatus includes an input shaft 12 that may be the crank shaft of an engine 13 with which the apparatus 10 is associated, or it can connect to a gear 14 carried on the end of the input shaft 12 remote from the drive apparatus of the invention. The gear 14 is present in the accessory drive of commercially available engines, or the shaft can connect to any other suitable drive member as desired. A housing 16 for the apparatus extends forwardly from the engine 13 and is secured thereto as by cap screws 18 and 19, or the like that engage a flange 20 fixedly positioned on the engine 13. An output shaft 22 is provided at the forward end of the drive apparatus. The housing 16 preferably comprises an attachment plate 24 and a forward tubular section 26 and these separate parts can be individually attached to the flange 20 or equivalent portions on the engine housing by the cap screws 18 and 19, or can be otherwise secured together in any conventional manner. By providing two parts in the housing 16, the attachment plate 24 can be initially secured to the flange 20 and engine block to position suitable bearings 28 to journal the input shaft in the apparatus.

The tubular section 26 of the housing has a radially inwardly extending flange 30 formed thereon, which flange and associated cylindrical inner wall 32 of the tubular housing section 26 form an operative pressure chamber 36 in combination with an annular piston 34 that is slidably positioned in the housing to complete formation of the pressure cylinder 36. The annular piston 34 has a cylindrical forwardly projecting flange 38 formed thereon which is in sliding engagement with a conventional seal means 40 carried by the radially inner surface of the flange 30 for sealed sliding engagement between the cylindrical flange 38 and the housing. Operative pressure fluid, normally air, is supplied to this pressure cylinder 36 by an air tube 42 connecting by conventional fitting 44 to a bore 46 in the wall of the tubular section 26. The bore 46 connects to the pressure cylinder 36 for fluid pressure supply thereto. When air pressure is supplied to the cylinder 36, it forces the annular piston 34 axially to the right for clutch release action, as hereinafter described.

Operative pressure is applied to the annular piston 34 by a plurality of circumferentially spaced coil springs 48 compresssed between the annular piston and the attachment plate 24 of the housing. Preferably cylindrical recesses 50 and 52 are formed in the adjacent radially extending surfaces of the rear wall of the annular iston 34 and the forward surface of the attachment late 24 to retain the springs in operative position.

An input sleeve 54 is suitably secured to the forward nd of the input shaft 12 for rotation therewith and ich sleeve is concentric with but positioned within and idially spaced from an output sleeve 56. This output eeve is operatively carried by a connector or positioning plate member 58 that extends radially inwardly and xially forwardly in the apparatus to position and form unit with the output shaft 22. The member 58 is reined against axial movement in the apparatus to form stop member for compression of the stack of clutch iscs against such member. A suitable bearing 60 jourals this member 58 at the forward end of the tubular ousing section 26. A conventional seal 62 seals the inrior of the housing with relation to a reinforcing hub 4 suitably carried by the member 58 at its forward d.

To form the drive clutch, a stack of clutch discs 66 e provided in splined engagement with the input eeve 54 and a second stack of discs 68 of radially rger diameters are positioned intermediate the discs 5 to form an alternate clutch disc stack wherein the dially longer discs 68 are in splined engagement with e output sleeve 56.

A pressure sleeve 70 is provided for operatively conecting the annular piston 34 to the stack of discs 66 d 68 for controlling clutch engagement action. Such essure sleeve 70 has a front flange 72 with a flat face that engages an end disc 68a in the stack of discs 68. ich pressure sleeve is rotatably carried by and seired to the annular piston 34 by a bearing 74 that is cured to a radially inner portion of the annular piston a spring washer 76 or the like. Thus, the pressure eve 70 will move axially with the annular piston 34 it is rotatable in relation thereto. The flange 72 is reived in an annular recess 75 formed on a radially ner wall of the output sleeve and is in sliding, lost mo)n, splined engagement therewith.

As another feature of the apparatus of the invention, uitable brake means such as brake blocks or brake g 78 is secured to the end of the pressure sleeve 70 mote from the stack of discs by screws 79. The brake c or ring 78 is positioned axially spaced from but imdiately adjacent a flat surface 80 formed on a radiy inner portion of the attachment plate 24.

As indicated hereinbefore, the apparatus is actuated the springs 48 normally forcing the annular piston axially toward the output shaft 22 for pressure engement of the stacks of discs 66 and 68 to provide tput drive for a fan 82 or other member secured optively to the output shaft 22. However, by introducg a controlled pressure air supply through the air suptube 42, the annular piston can be retracted or ved axially toward an inoperative position for the tch means, so that a variable pressure can be applied the clutch discs to permit some slippage therebeen. To provide an oil shear action in these clutch cs for transmitting drive forces therethrough, the apatus of the invention uses a supply of lubricant oil m the associated engine to the clutch disc stack to nerse the same in oil and provide drive forces by an shear action when the clutch plates are not tightly ced together. Hence any suitable internal or external ans can connect the apparatus 10 to the engine luation system and a lubricant inlet tube 84 is shown necting to a radially extending bore 86 formed in the attachment plate 24 to lead to the interior of the housing 16. Such bore 86 operatively connects to bores 88 that are aligned with each other and sealed to extend to the external surface of the flange 20 for conventional connection of the oil supply tube thereto. Such oil flows through the apparatus of the invention as by slots or bores 90 formed in the input sleeve 54 and exhausting within the housing within the stack of discs 66 and 68 for radially outward flow therethrough. The oil flows around in the housing for exhaust through a bore 92 formed in the housing section 26 and through a tube 94 connecting back to the engine lubrication system.

A suitable seal 95 is carried by the annular piston 94.

In operation, when the engine is operating and the input shaft 12 is driven, and when no air is supplied through the air pressure supply tube 42, the output shaft is driven at the same speed as the input shaft because the springs 48 force the annular piston 34 and the pressure sleeve 70 into pressured engagement with the stacks of discs 66 and 68. The discs will hence be in locked frictional engagement for transmission of driving forces to the output shaft. However, when air pressure is supplied by the air tube 42, the annular piston is retracted in relation to its pressurization action on the stack of discs 66 and 68 and some slippage occurs between the clutch discs so that the output shaft is driven at a lesser speed than the input shaft. If any type of a restricted or controlled air pressure is provided, then the clutching action of the discs 66 and 68 can be adjusted or regulated to provide any desired percentage of drive for the output shaft in relation to the rotational speed of the input shaft.

The supply of air through the air supply tube can be regulated, as by providing a rapid input of the high pressure air from a temperature sensitive switch or other valve control measuring the engine temperature to provide an on-off operation of the clutch means for either full operative engagement thereof or disconnection of the clutch. Normally when full air pressure or spring overcoming pressure is supplied to the pressure cylinder 36, it forces the annular piston rearwardly and the brake ring 78 carried thereby is moved into pressure engagement with the pressure face 80 on the attachment plate to completely stop rotation of the pressure sleeve 70. Such pressure sleeve, being in splined engagement with the output sleeve, thus effectively stops any rotation of the output shaft. A valve 96 is shown to control air flow and hence pressure and it has a conventional temperature responsive control means 98 to regulate the valve action. The control means 98 is connected to the engine water circuit by tubes 99 to receive the water and have its temperature control a bimetal arm controlling the valve 96 for metered air supply dependent upon the water temperature. Such control means is the same or very similar to a Minneapolis Honeywell Co. Gradustat.

A wear ring 63 is carried on the drive shaft 22.

From the foregoing, it will be seen that the coil springs 48 normally provide operative pressures to the annular piston 34 for effective engagement between the stacks of discs 66 and 68 for unitary rotational speed of the input and output shafts. The discs 66 and 68 do not need to engage each other as the pressured oil flow between the discs will provide a shear drive with the frictional facings on the discs.

The flow of oil to the apparatus of the invention normally is variable dependent upon the engine speed and such oil supply is connected to the engine lubricant lubricating system for positive pressurized flow of a lubricant to the apparatus for flooding the stacks of discs 66 and 68 with oil at all times from the bore 90 and slots 91. Naturally, when convenient, the lubricant oil can be supplied to the bore 86 provided in the housing attachment plate directly by internal flow connecting means from the engine, rather than by any external supply tube or member.

From the foregoing, it will be seen that a relatively axially short, uncomplicated clutch drive system has been provided for an output shaft such as one carrying the fan on a combustion engine. The apparatus is failsafe in that the clutch will remain operative even if the air supply to the apparatus fails. A novel and improved drive apparatus has been provided.

While one complete embodiment of the invention has been disclosed herein, it will be appreciated that modification of this particular embodiment of the invention may be resorted to without departing from the scope of the invention.

What is claimed is:

1. In a fan drive clutch and brake apparatus for a combustion engine, a driven input shaft, an output shaft, and a fan on said output shaft, a housing for said shafts, and characterized by an annular piston slidably positioned in said housing and forming a pressure cylinder with said housing.

a pressure sleeve, an output sleeve connected to said output shaft, an input sleeve carried by said input shaft and positioned concentrically of and within said output sleeve, a stack of clutch discs alternately keyed to said output sleeve and to said input sleeve by spline means, bearing means securing said pressure sleeve to said annular piston for axial movement therewith, said pressure sleeve being positioned for operatively engaging said clutch discs to apply compressive pressure thereto, spring means to urge said annular piston axially to move said pressure sleeve into engagement with said clutch discs, said pressure sleeve having an end in splined engagement with said output sleeve, a brake means secured to the end of said pressure sleeve remote from said clutch discs which brake disc is adjacent a pressure surface formed on said housing, and air supply means connecting to said pressure cylinder to retract said annular piston and bring said brake means into engagement with said housing to stop rotation of said output shaft.

2. A drive apparatus as in claim 1 including said housing having a flange forming a wall of said pressure chamber, and said annular piston having an axially extending cylindrical flange thereon in sealed sliding engagement with said flange.

3. A drive apparatus as in claim 1 including an adjustable pressure control means provided in the air supply means to vary the pressure engagement of said clutch discs, and means to supply a flow of oil to said housing to embed said clutch discs in oil.

4. A drive apparatus as in claim 1 where said housing includes an attachment plate means and a tubular section, and said spring means seat in recesses formed in adjacent surfaces of said attachment plate means and said annular piston to be compressed between such plate means and piston.

5. In a drive apparatus for a fan for a combustion engine, a driven input shaft, an output shaft, and a fan on said output shaft, and a housing for said shafts attachable to an engine, characterized by an annular piston slidably positioned in said housing and forming a pressure cylinder with said housing, a pressure sleeve, an output sleeve connected to said output shaft, an input sleeve carried by said input shaft and positioned concentrically of and within said output sleeve, a stack of clutch discs alternately keyed to said output sleeve and to said input sleeve by spline means, bearing means securing said pressure sleeve to said annular piston for axial movement therewith, said pressure sleeve being positioned for operatively engaging an end of said clutch discs to apply compressive pressure thereto, spring means positioned between said housing and said annular piston to urge said annular piston axially to move said pressure sleeve into engagement with said clutch discs, and fluid pressure supply means connecting to said pressure cylinder to retract said annular piston and release said clutch discs.

6. A drive apparatus as in claim 5 including said housing having an inwardly extending flange forming a wall of said pressure chamber, and said annular piston having an axially extending cylindrical flange thereon in sealed sliding engagement with said flange.

7. A drive apparatus as in claim 5 including an engine temperature controlled metering pressure means controlling the fluid pressure to vary the pressure engagement of said clutch discs.

8. A drive apparatus as in claim 7 where a temperature sensitive control responsive to the engine temperature operatively connects to said air pressure control means to regulate the air pressure supplied to said pressure cylinder and increase the pressure when the engine is relatively cool and decrease the pressure when the engine is relatively hot.

9. A drive apparatus as in claim 5 including means to supply a flow of oil under pressure to said housing to embed said clutch discs in oil.

10. A drive apparatus as in claim 1 where said output sleeve has a splined recess on its radially inner wall at one end of such sleeve, said pressure sleeve has a flange at one end thereof a peripheral portion of which engages said splined recess and is free for limited axial movement in relation to said output sleeve.

* * * * *